US005677070A

United States Patent [19]

Dimigen et al.

[11] Patent Number: 5,677,070

[45] Date of Patent: Oct. 14, 1997

[54] RESISTIVE FILM

[75] Inventors: Heinz Dimigen; Claus-Peter Klages, both of Hamburg; Rainer Veyhl, Heide; Klaus Taube, Hamburg; Rudolf Thyen, Bothkamp; Hubertus Hübsch, Hamburg; Eckart Boettger, Soltau, all of Germany

[73] Assignee: U.S. Philips Corporation, New York, N.Y.

[21] Appl. No.: 639,327

[22] Filed: Apr. 25, 1996

Related U.S. Application Data

[63] Continuation of Ser. No. 76,044, Jun. 15, 1993, abandoned.

[30] Foreign Application Priority Data

Jun. 16, 1992 [DE] Germany .......................... 42 196 49.3

[51] Int. Cl.[6] ...................................................... B32B 18/00

[52] U.S. Cl. .......................... 428/688; 428/689; 428/697; 428/698; 428/699; 428/701; 252/503; 252/506; 338/308

[58] Field of Search .................................... 428/688, 689, 428/657, 698, 699, 701, 408; 252/503, 506; 338/308

[56] References Cited

U.S. PATENT DOCUMENTS

| | | | |
|---|---|---|---|
| 4,599,193 | 7/1986 | Murase | 252/506 |
| 5,106,538 | 4/1992 | Barma | 252/506 |

FOREIGN PATENT DOCUMENTS

| | | |
|---|---|---|
| 0247413 | 12/1987 | European Pat. Off. . |
| 2809623 | 9/1978 | Germany . |

*Primary Examiner*—Timothy Speer
*Attorney, Agent, or Firm*—Norman N. Spain

[57] ABSTRACT

The invention relates to a resistive film comprising carbon (40–95 at. %), one or more metal(s) (4–60 at. %) and hydrogen (1–30 at. %), said film having a resistivity in excess of 1000μΩcm and a temperature coefficient TC in the range between −100 and +100 ppm/K.

18 Claims, No Drawings

RESISTIVE FILM

This is a continuation of application Ser. No. 08/076,044, filed Jun. 15, 1993 now abandoned.

BACKGROUND OF THE INVENTION

The invention relates to a resistive film comprising carbon and a metal, and to a discrete resistor which is provided with such a resistive film.

Resistive films of said type are already known. In DE-OS 2809623 description is given of a method of manufacturing resistive films of Ta—$C_x$, where 0.35>x >0.8, by means of cathode sputtering.

This method shows (see, for example, FIG. 3) that in the Ta—C system the low temperature coefficient (TC) of −25 ppm/K is associated with a resistivity of 200–300 μΩcm. Consequently, these films are unsuitable for high-valued precision resistors, i.e. precision resistors having a resistivity in excess of 1000 μΩcm.

EP 247.413-A1 also describes resistive films which are manufactured by sputtering zirconium/palladium, titanium/gold, zirconium/gold, hafnium/gold or titanium/palladium in a reactive gas atmosphere. According to the teachings of said document, as described in column 3, lines 16–19 of the description and in claim 3, only films consisting of nitrides, carbides or carbonitrides should be manufactured.

Consequently, the films manufactured in accordance with said document consist of metallically conductive inclusions (gold, palladium or platinum) in a metallically conductive matrix (carbide or nitride). Due to their high conductivity, such metal composite films are unsuitable for use as films having a high resistivity. The temperature dependence of the resistor is not further specified.

Present-day microelectronic applications, however, require resistance values in excess of 1MΩ at the lowest possible temperature coefficients (TC) of the resistor. A prerequisite condition for the utilization of such components are resistive-film materials having a high resistivity of at least 1000 μΩcm at a very low temperature coefficient. The metal-metalcarbide-films in accordance with the state of the art cannot meet these requirements. For this reason also CrSi systems for use in high-valued film resistors are utilized at present. Although these films are an improvement on the previously used deposited-carbon resistors, their properties, as regards high-impedance value, temperature coefficient and long-term stability do not meet the requirements to be satisfied by film systems for use as precision resistors in microelectronic applications.

The resistance of a discrete resistor can be increased by a microstructuring process (coiling for cylindrical resistor bodies and meandering for flat resistor bodies). However, the limited overall surface area of the resistor imposes an upper limit on the terminal value/basic value ratio to be attained in this process, because the conductor path must have a minimum width. However, the trends in the development of discrete resistors are toward miniaturization. At present, the surface area of the smallest components are only approximately 1×2 $mm^2$. Consequently, the high-impedance requirement can only be met by increasing the resistivity of the film materials used.

SUMMARY OF THE INVENTION

For this purpose, it is an object of the invention to provide a film-resistor material which combines a resistivity in excess of 1000 μΩcm with a temperature coefficient TC in the range between −100 and +100 ppm/K. It is a further object of the invention to provide a corresponding resistor which can suitably be used as a discrete component.

This object is achieved in that a resistive film is proposed which consists of 40–95 at. % of carbon, 4–60 at. % of one or more metal(s) and 1–30 at. % of hydrogen, whereby no carbide-formation has occurred, the percentages of the combined components of the film being equal to 100%. These films have preferably a resistivity in excess of 1000 μΩcm and a temperature coefficient TC in the range between −100 and +100 ppm/K. Surprisingly it has been found that certain Me—C:H films have a resistivity in excess of 1000 μΩcm and a temperature coefficient TC in the range between −50 and +50 ppm/K when no carbide formation has taken place between the metal(s) and the carbon. In a preferred embodiment, the metals are selected from the $1^{st}$ and/or the $8^{th}$ sub-group (more commonly referred to as Groups 8 and 1B under older IUPAC nomenclature, as Groups VIII and IB under Chemical Abstracts nomenclature, and as Groups 8, 9, 10 and 11 under more recent IUPAC nomenclature) of the periodic table of the elements, in particular, the copper group and/or platinum group. In this case, Ag, Pt, Au and/or Cu proved to be very suitable. In a further preferred embodiment, the film contains preferably 60–75 at. % of carbon, 25–30 at. % of one or more metal(s) and 5–8% of hydrogen.

In a further preferred embodiment, carbon is partially replaced by silicon and/or boron and/or nitrogen. Advantageously, between 1 and 95 %, preferably between 1 and 40 % of the carbon and/or boron and/or nitrogen is replaced by silicon. This measure even leads to higher resistance values.

BRIEF DESCRIPTION OF THE INVENTION

The films according to the invention consist of a highly cross-linked hydrocarbon matrix with, preferably, embedded nanocrystalline, metallically conductive particles. As regards the electrical properties of these particles, they behave like metal (positive temperature coefficient of resistance TC) if the metal content is high and if the metal content is sufficiently low they behave like semiconductors (TC<0). Consequently, for each Me—C:H system there is a composition at which TC=0. The resistivity associated with a film of TC=0, as estimated by interpolation, amounts to about 200–300 μΩcm for the film-system titanium CH, tantalum CH and niobium CH, and to approximately 10,000 μΩcm for platinum CH, gold CH and copper CH. Consequently, films comprising non-carbide-forming components, such as platinum, gold and copper deviate substantially from the well known empirical laws known as "Mooij's laws", according to which the vast majority of conductors combines a TC between −100 and +100 ppm/K with a resistivity between approximately 100 and 200 μΩcm.

The Me—C:H films are manufactured by means of prior art methods, such as CVD or PVD. By means of a subsequent tempering process, preferably in air, the properties of the film are stabilized (pre-aging). The thereby induced changes in the film structure (increase in particle size, repair of crystal lattice, increase of matrix) as well as the changes in the chemical composition (incorporation of oxygen, removal of hydrogen and carbon) cause also a change of the electrical properties. Depending on the film system and metal content, it is possible to obtain a Tk near to 0 ppm/K by using appropriate aging conditions (temperature, time, surrounding medium). In order to protect the film during the aging against thermal decomposition, caused by oxygen from the air, it is possible to provide an additional passivation layer on the resistive film. A silicium-containing carbon/hydrogen layer (a-CSi:H) can suitably be used for this purpose.

Consequently, by means of the thin-film material in accordance with the invention, resistivities which are higher than in the case of CrSi (approximately 1000 μΩcm) can be attained at an equal temperature coefficient. In addition, by virtue of the particular microstructure of the material (dense amorphous network), a considerably improved long-term stability is obtained.

The invention further relates to a resistor for use as a discrete component. In accordance with the invention, the above-described resistive film is subsequently provided on a substrate in a thickness of from 10 nanometer to 10 μm, preferably from 50 nanometer to 5 μm by means of the known methods. In a preferred embodiment a substrate of AlN, BN, $Al_2O_3$, SiC or silicate is used.

The invention will be explained in greater detail by means of three exemplary embodiments.

DETAILED DESCRIPTION OF THE PREFERRED EMBODIMENTS

EXAMPLE 1

Au—C:H

A plasma is ignited in a parallel-plate-RF-sputtering device (13.56 MHz, 800 W, 1.5 kV DC-bias), comprising a gold target (15 cm), at a pressure of 0.03 mbar in a gas atmosphere of argon (46 sccm) and ethylene (3 sccm). (seem means standard cubic centimeter per minute, and is equal to $cm^3$/min. under standard conditions.) An Au—C:H film having a thickness of 1.5 μm is deposited in 17 minutes on a quartz substrate arranged at a distance of 6 cm from the target. Elementary analysis (electron beam microprobe) shows that the atomic gold content amounts to 0.55 and that the overall hydrogen content is less than 30 at. %. As regards the electrical characteristics of the film, the resistivity amounts to 2500 μΩcm and TC amounts to 45 ppm/K at room temperature.

EXAMPLE 2

Pt—C:H

Pt—C:H films were manufactured by RF sputtering. The distance between the target and the substrate was 5.5 era, the overall pressure was 0.020 mbar. The acetylene content of the gas phase was 2 % (remainder: argon). Target voltage 1.5 kV, substrate bias +20 V. In this manner, 0.5 μm thick films were formed on ceramic substrates in 30 minutes. Elementary analysis demonstrated that the atomic platinum content amounted to 0.09 and that the overall water content was less than 30 at. %. As regards the electrical characteristics of the film after a tempering process (1 hour, air, 300° C.), the resistivity amounted to 19,000 μΩcm and TC amounted to 40 ppm/K at room temperature.

EXAMPLE 3

Pt—Si—C:H

Pt—Si—C:H films have been manufactured by means of reactive RF-sputtering with tetramethylsilane (TMS). The distance between the target and the substrate was 5.5 cm, the target voltage was 2.0 kV. At a pressure of 0.01 mbar the TMS-partial pressure was 0.001 mbar (remainder: argon). At a coating process duration of 1 hour, films having a thickness of 2 μm were manufactured. By elementary analysis it was found that the atomic platinum content amounted to 0.33, the atomic silicon content to 0.12 and the atomic hydrocarbon content to 0.55. The overall hydrogen content was less than 30 at. %. As regards the electrical characteristics of the film after a tempering process (8 h, air, 300° C.), the resistivity amounted to 63,000 μΩcm and TC amounted to −46 ppm/K at room temperature.

We claim:

1. An article comprising a substrate and a resistive film on said substrate, wherein said resistive film consists of 40–95 at. % of carbon, 4–60 at. % of at least one metal and 1–30 at. % of hydrogen, is free of carbide formation, has a resisistivity in excess of 1,000 μΩcm and a temperature coefficient in the range of −100 to +100 ppm/K.

2. An article as claimed in claim 1, characterized in that said film comprises approximately 60–75 at. % of carbon, 25–30 at. % of at least one metal and 5–8 at. % of hydrogen.

3. An article as claimed in claim 2 wherein between 1–95% of carbon is replaced by silicon, boron, or nitrogen and mixtures thereof.

4. An article as claimed in claim 2, characterized in that the at least one metal is a transition metal or mixture thereof selected from Groups IB and VIII of the periodic table of the elements.

5. An article as claimed in claim 2, wherein the metal is at least one metal selected from the group consisting of Ag, Au, Pt and Cu.

6. An article as claimed in claim 1, characterized in that between 1–95% of carbon is replaced by silicon, boron, or nitrogen and mixtures thereof.

7. An article as claimed in claim 6, characterized in that the at least one metal is a transition metal or mixture thereof selected from Groups IB and VIII of the periodic table of the elements.

8. An article as claimed in claim 6, wherein the said at least one metal is present in the form of particles having a particle size measured in nanometers.

9. An article as claimed in claim 6, wherein the metal is at least one metal selected from the group consisting of Ag, Au, Pt and Cu.

10. An article as claimed in claim 1, characterized in that the at least one metal is a transition metal or mixture thereof selected from Groups IB and VIII of the periodic table of the elements.

11. An article as claimed in claims 10, wherein the said at least one metal is present in the form of particles having a particle size measured in nanometers.

12. An article as claimed claim 10, wherein the metal is at least one metal selected from the group consisting of Ag, Au, Pt and Cu.

13. An article as claimed in claim 1, characterized in that the at least one metal is present in the form of particles having a particle size measured in nanometers.

14. An article as claimed claim 13, wherein the metal is at least one metal selected from the group consisting of Au, Pt and Cu.

15. An article as claimed in claim 1, wherein the said at least one metal is present in the form of particles having a particle size measured in nanometers.

16. An article comprising a substrate and a resistive film on said substrate, wherein said resistive film consists of 40–95 at. % of carbon, replaced by a member selected from the group consisting of silicon, boron and nitrogen and mixtures thereof in an amount of from 1–95 at %, 4–60 at. % of at least one transition metal, and 1–30 at. % of hydrogen, is devoid of carbide formation, has a resistivity in excess of 1,000 μΩcm and a temperature coefficient in the range of −100 to +100 ppm/K.

17. An article as claimed in claim 16, wherein said film comprises approximately 60–75 at. % of carbon, 25–30 at. % of at least one transition metal and 5–8 at. % of hydrogen.

18. An article as claimed in claim 16, wherein the at least one metal is present in the form of particles having a particle size measured in nanometers.

* * * * *